(12) United States Patent
Matsuoka et al.

(10) Patent No.: US 9,889,796 B2
(45) Date of Patent: Feb. 13, 2018

(54) DRIVING SUPPORT DEVICE (71) Applicant: TOYOTA JIDOSHA KABUSHIKI KAISHA, Toyota-shi (JP)

(72) Inventors: Katsuhiro Matsuoka, Nagatuke (JP); Kazuhiro Morimoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/229,159

(22) Filed: Aug. 5, 2016

(65) Prior Publication Data

US 2017/0072852 A1   Mar. 16, 2017

(30) Foreign Application Priority Data

Sep. 15, 2015  (JP) .................................. 2015-182103

(51) Int. Cl.
*G08G 1/00* (2006.01)
*B60Q 9/00* (2006.01)
*G07C 5/02* (2006.01)
*G08G 1/16* (2006.01)
*B60W 40/10* (2012.01)
*G06K 9/00* (2006.01)

(52) U.S. Cl.
CPC ............. *B60Q 9/008* (2013.01); *B60W 40/10* (2013.01); *G06K 9/00771* (2013.01); *G07C 5/02* (2013.01); *G08G 1/164* (2013.01); *G08G 1/166* (2013.01)

(58) Field of Classification Search
CPC ........................... B60W 2550/14; G08G 1/164
USPC ........................................................ 340/902
See application file for complete search history.

(56) References Cited

U.S. PATENT DOCUMENTS

| | | | |
|---|---|---|---|
| 2004/0193347 A1* | 9/2004 | Harumoto | B60R 21/0132 701/45 |
| 2005/0085954 A1* | 4/2005 | Isaji | B60K 28/066 701/1 |
| 2007/0257783 A1* | 11/2007 | Matsumoto | B60K 6/445 340/425.5 |

FOREIGN PATENT DOCUMENTS

| | | |
|---|---|---|
| JP | H07-244800 | 9/1995 |
| JP | 2009-32067 | 2/2009 |
| JP | 2013-025635 | 2/2013 |

* cited by examiner

*Primary Examiner* — Fabricio R Murillo Garcia
(74) *Attorney, Agent, or Firm* — Oblon, McClelland, Maier & Neustadt, L.L.P.

(57) ABSTRACT

An alarm controller generates an alarm output instruction when an own vehicle state determination unit determines that an own vehicle intends to cross the opposite lane at an intersection, and the object state determination unit determines that an oncoming vehicle or a person exists or moves in a direction in which the own vehicle crosses the opposite lane at into the intersection. A shift position detector detects a shift lever position. When the shift position detector detects that a shift lever is in a parking position or a reverse position, the alarm controller does not generate the alarm output instruction.

3 Claims, 10 Drawing Sheets

DRIVING SUPPORT DEVICE

BACKGROUND OF THE INVENTION

1. Field of the Invention

The present invention relates to a technique for supporting driving at an intersection and especially relates to a technique which attracts drivers' attention by an alarm when a vehicle intends to proceed into the intersection and cross the opposite lane.

2. Description of the Related Art

Patent document 1 discloses a service to provide information for notifying a vehicle waiting for turning right that an oncoming vehicle is driving straight through and approaching. Patent document 1 discloses that this service is used for right-turn start determination when an oncoming vehicle cannot be seen from a driver, or when the oncoming vehicle is hard to be seen from the driver. In this service, because it is not necessary to provide the information when the driver can certainly confirm that an oncoming vehicle is not approaching and can turn right without slowing down or stopping temporarily, the information is provided when an own vehicle travels at a constant speed or less.

[patent document 1] JP 2009-32067A

In a driving support control in the case of turning right on a road kept left, drivers' attention is attracted by an alarm such as screen display and sound output by using detection information by an object detection sensor in a roadside machine and oncoming vehicle information by vehicle-to-vehicle communication to support the prevention of collision with an object such as an oncoming vehicle and a pedestrian. However, if an alarm is output even in the case of no or low risk of collision, the alarm might annoy a driver and disturb safe driving.

SUMMARY OF THE INVENTION

The present invention is in view of the above state. An object of the present invention is to provide a technique not to output an unnecessary alarm.

To solve the above issue, a driving support device in a mode of the present invention includes an acquirer, an own vehicle state determiner, an object state determiner, an alarm controller, and an alarm outputter. The acquirer acquires object information on at least one of an oncoming vehicle and a person at an intersection. The own vehicle state determiner determines whether an own vehicle intends to cross an opposite lane at the intersection. The object state determiner determines based on the acquired object information whether an oncoming vehicle or a person exist, or the oncoming vehicle or the person is approaching, in a direction in which the own vehicle travels to cross the opposite lane at the intersection. The alarm controller generates an alarm output instruction when the own vehicle state determiner determines that the own vehicle intends to cross the opposite lane at the intersection, and the object state determiner determines that an oncoming vehicle or a person exists or moves in a direction in which the own vehicle travels to cross the opposite lane at the intersection. The alarm outputter outputs an alarm on receipt of the alarm output instruction. The driving support device further includes a shift position detector for detecting a shift lever position. When the shift position detector detects that the shift lever is in a parking position or a reverse position, the alarm controller does not generate the alarm output instruction.

According to this mode, when a driver operates a shift lever to the parking position or the reverse position, it is determined that the driver does not intend to move an own vehicle forward, and the alarm outputter is controlled so as not to output an unnecessary alarm.

When the shift position detector detects that the shift lever is in the parking position or the reverse position, the own vehicle state determiner determines that the own vehicle cannot move forward currently. When the own vehicle state determiner determines that the own vehicle does not move forward, the alarm controller does not generate an instruction to output an unnecessary alarm.

When the shift position detector detects that a shift lever is in a parking position or a reverse position after the alarm outputter outputs an alarm, the alarm controller generates an instruction to stop alarm output. In this manner, even after an alarm is output, the alarm output can be immediately stopped when the alarm output is not needed.

DETAILED DESCRIPTION OF THE INVENTION

The invention will now be described by reference to the preferred embodiments. This does not intend to limit the scope of the present invention, but to exemplify the invention.

Figure 1:
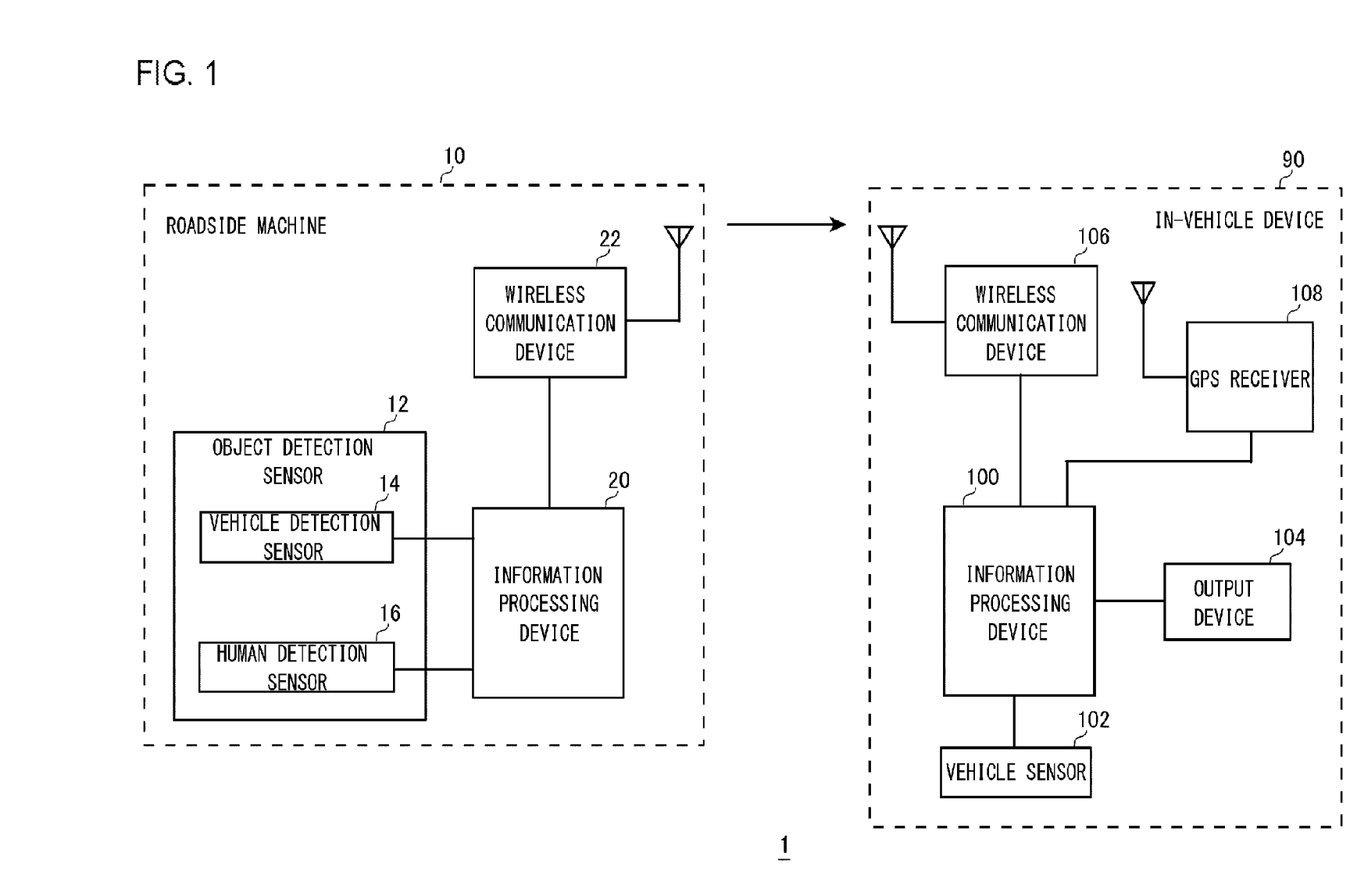
FIG. 1 is a diagram illustrating a configuration of a road-to-vehicle communication system according to an embodiment.

FIG. 1 illustrates a configuration of a road-to-vehicle communication system 1 according to an embodiment. The road-to-vehicle communication system 1 includes a roadside machine 10 installed at or around an intersection and an in-vehicle device 90 mounted in a vehicle. As described later, the roadside machine 10 includes multiple elements. In the present description, "the roadside machine 10 is installed at or around an intersection" means including a case where all elements of the roadside machine 10 are installed at the intersection, a case where all elements of the roadside machine 10 are installed around the intersection, and also a case where a part of the elements of the roadside machine 10 is installed at the intersection, and the other elements are installed around the intersection.

When a vehicle intends to cross the opposite lane at an intersection, the road-to-vehicle communication system 1 realizes a driving support system by which a driver can pay attention to other vehicles traveling on the opposite lane and pedestrians walking on a pedestrian crossing ahead of the opposite lane. Crossing the opposite lane on an intersection is turning right at an intersection in countries such as Japan and England where vehicles drive on the left side and turning left at an intersection in countries such as USA, German, and China where vehicles drive on the right side. In the embodiment, the driving support system will be described which supports to pay attention to oncoming vehicles and pedestrians when a vehicle turns right at an intersection based on an assumption that vehicles drive on the left.

The roadside machine 10 includes an object detection sensor 12, an information processing device 20, and a wireless communication device 22. The object detection sensor 12 includes a vehicle detection sensor 14 and a human detection sensor 16. The vehicle detection sensor 14 detects a traveling vehicle. The human detection sensor 16 detects a pedestrian and a person riding on a bicycle. Detection information by the vehicle detection sensor 14 and detection information by the human detection sensor 16 are provided to the information processing device 20 at a predetermined cycle.

The vehicle detection sensor 14 detects a state of a vehicle traveling toward the center of an intersection. The center of the intersection is positioned on a line vertically dividing an intersection area into two with respect to a traveling direction (refer to FIG. 3). Detection information by the vehicle detection sensor 14 may include existence of a vehicle, a position of the vehicle, and a speed of the vehicle. The vehicle detection sensor 14 may include a radar sensor and an image sensor.

The human detection sensor 16 detects a pedestrian walking on a pedestrian crossing and a person riding on a bicycle at an intersection. Detection information by the human detection sensor 16 may include existence of a person, a position of the person, and a moving direction and a speed of the person. The human detection sensor 16 may include a radar sensor and an image sensor.

The information processing device 20 is a computer. Each function of the information processing device 20 to be described later is configured by a circuit block, a memory, and other LSI in the manner of hardware and is realized by such as a program loaded in the memory in the manner of software. Therefore, a person skilled in the art understands that each function of the information processing device 20 can be realized in various forms by hardware, by software, or by combination of hardware and software, but not limited to any of these. The information processing device 20 obtains detection information by the object detection sensor 12 and generates object information to be provided to the in-vehicle device 90.

Further, the information processing device 20 stores road linear information (map information) at or around an intersection where the information processing device 20 is installed. The road linear information includes information for realizing a driving support service for a time when a vehicle turns right and, for example, includes a starting position which is the basis of service start and an end position which is the basis of service stop.

The wireless communication device 22 sends object information and road linear information to the in-vehicle device 90 at a predetermined cycle as intersection information. For example, the wireless communication device 22 sends the object information and the road linear information at every 0.1 seconds at or around an intersection by broadcasting. The intersection information may include control information including traffic control information and speed control information and signal information indicating a signal cycle and a current lamp color of a traffic signal in addition to the object information and the road linear information.

The in-vehicle device 90 forms a driving support device by including an information processing device 100, a vehicle sensor 102, an output device 104, a wireless communication device 106, and a global positioning system (GPS) receiver 108.

The information processing device 100 is a computer. Each function of the information processing device 100 to be described later is configured by a circuit block, a memory, and other LSI in the manner of hardware and is realized by such as a program loaded in the memory in the manner of software. Therefore, a person skilled in the art understands that each function of the information processing device 100 can be realized in various forms by hardware, by software, or by combination of hardware and software, but not limited to any of these.

The vehicle sensor 102 includes such as a wheel speed sensor, a brake operation detector, a direction indicator operation detector, an accelerator operation detector, a shift position detector. The brake operation detector detects an operation state of a brake pedal. The direction indicator operation detector detects an operation state of a direction indicator lever. The accelerator operation detector detects an operation state of an accelerator. The shift position detector detects an operation position of a shift lever (shift position). Detection information by each of them is provided to the information processing device 100. The brake operation detector is a sensor for detecting brake operation by a driver, may be a means for detecting on/off of a stop lamp switch, and may be a means for detecting, for example, a master cylinder pressure and a wheel cylinder pressure. The direction indicator operation detector detects an operation position of the direction indicator lever, and according to the embodiment, the direction indicator operation detector generates detection information indicating that a right direction indicator is turned on when the right direction indicator is turned on and generates detection information indicating that the right direction indicator is turned off when the right direction indicator is turned off. According to the embodiment, the detection information indicating that the right direction indicator is turned off includes detection information indicating that a direction indicator lever is operated from an on-position of the right direction indicator and moved to another position. The shift position detector generates detection information indicating a shift position.

The output device 104 is a device for outputting an alarm to a driver and includes a display device for outputting an alarm screen and a sound output device for outputting an alarm sound. The GPS receiver 108 calculates an own vehicle position based on a signal from a satellite. The GPS receiver 108 calculates a latitude, a longitude, and a direction of the own vehicle. The wireless communication device 106 receives intersection information sent by broadcasting from the wireless communication device 22 of the roadside machine 10.

Figure 2:
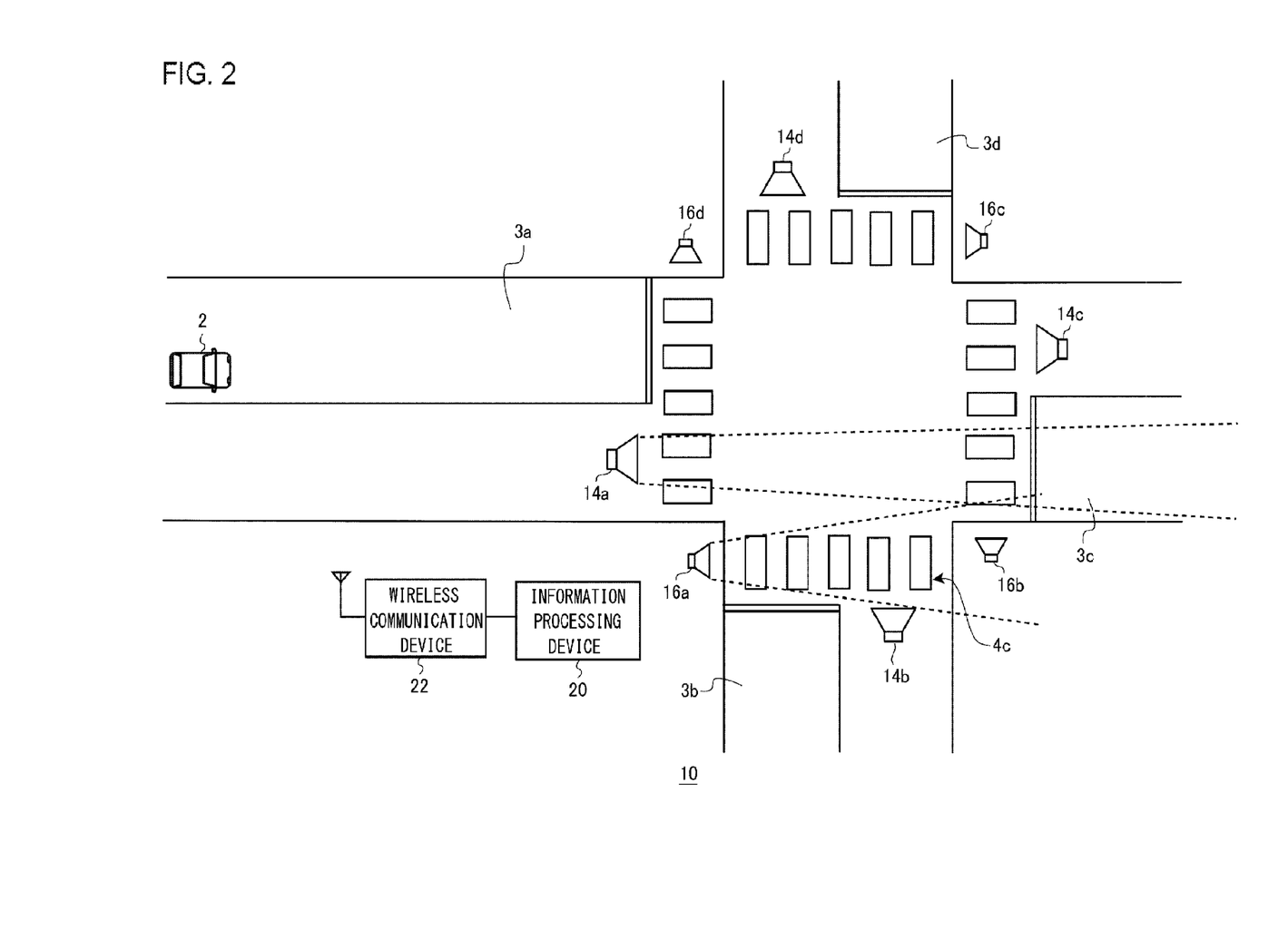
FIG. 2 is a view illustrating an example of a configuration of roadside machines at an intersection.

FIG. 2 illustrates an example of a configuration of the roadside machine 10 at an intersection where an own vehicle approaches. The intersection is a four-way junction with roads extending in four directions. The vehicle detection sensor 14 and the human detection sensor 16 are provided to each of the four routes extending to the intersection (hereinafter also called "a path").

When an own vehicle 2 moving on a path 3a proceeds into an intersection and turns right, a driver of the own vehicle 2 needs to pay attention to an oncoming vehicle proceeding into the intersection from a path 3c and a pedestrian walking on a pedestrian crossing 4c on the right side. Therefore, a vehicle detection sensor 14a and a human detection sensor 16a are provided at the intersection to support right turn of a vehicle proceeding into the intersection from the path 3a. The vehicle detection sensor 14a detects a vehicle traveling toward the intersection on the path 3c which is the opposite lane. The human detection sensor 16a detects a person on the pedestrian crossing 4c ahead of the opposite lane in a direction in which the right-turning vehicle crosses the opposite lane at the intersection. Similarly, a vehicle detection sensor 14b and a human detection sensor 16b are provided to support right turn of a vehicle proceeding into the intersection from a path 3b. A vehicle detection sensor 14c and a human detection sensor 16c are provided to support right turn of a vehicle proceeding into the intersection from the path 3c. A vehicle detection sensor 14d and a human detection sensor 16d are provided to support right turn of a vehicle proceeding into the intersection from a path 3d.

Each of the vehicle detection sensors 14a to 14d and each of the human detection sensors 16a to 16d are wire-connected by a cable (not illustrated) to the information processing device 20 and provide detection information to the information processing device 20. Each of the vehicle detection sensors 14a to 14d and each of the human detection sensors 16a to 16d may be wireless-connected to the information processing device 20 via the wireless communication device 22 and provide the detection information to the information processing device 20. An output cycle of the detection information by each sensor is set to 0.1 seconds, for example.

Figure 3:
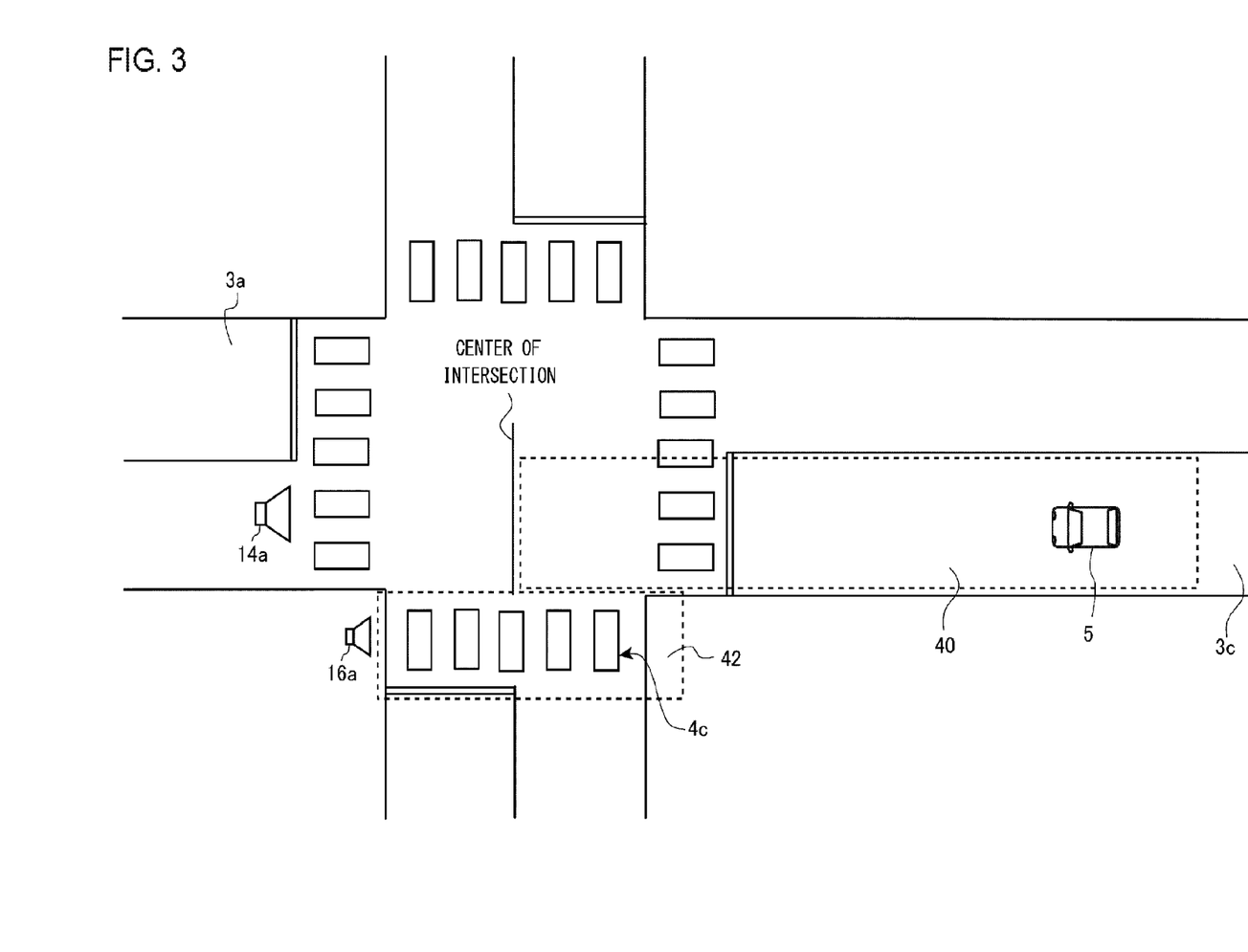
FIG. 3 is a view illustrating an example of a detection area of a vehicle detection sensor and a human detection sensor.

FIG. 3 illustrates an example of a detection area of the vehicle detection sensor 14a and the human detection sensor 16a. A vehicle detection area 40 in which the vehicle detection sensor 14a detects a vehicle is a range from a detection area end on the path 3c (the center of an intersection) to a predetermined distance and, for example, set to a range of approximately 140 m from the detection area end. A detection target is a vehicle moving on the path 3c toward an intersection. When viewed from a moving vehicle on the path 3a, the path 3c is an opposite lane, and also a vehicle moving on the path 3c is an oncoming vehicle. This example indicates that an oncoming vehicle 5 is moving toward the intersection.

The vehicle detection sensor 14a detects a speed of a vehicle in the vehicle detection area 40 and a distance to a detection area end. If there are multiple vehicles in the vehicle detection area 40, the vehicle detection sensor 14a detects a speed and a distance of each vehicle and outputs the vehicle speed and the distance to the detection area end as detection information for each vehicle to the information processing device 20.

A human detection area 42 in which the human detection sensor 16a detects a person is set to the whole of the pedestrian crossing 4c and a range around the pedestrian crossing 4c. A detection target includes a pedestrian and a person riding on a bicycle on and around the pedestrian crossing 4c. When the human detection sensor 16a detects a person in the human detection area 42, the human detection sensor 16a outputs, to the information processing device 20, detection information indicating the existence of a person. The human detection sensor 16a may output the moving direction and the moving speed as detection information for each person to the information processing device 20 by detecting a moving direction and a moving speed of the person.

Figure 4:
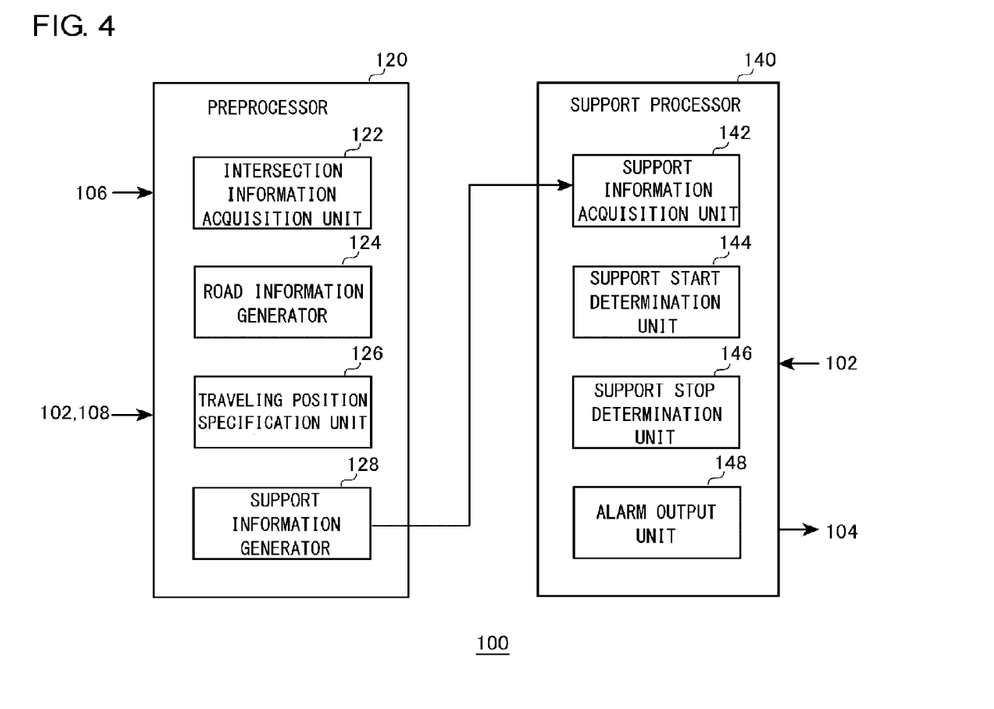
FIG. 4 is a diagram illustrating an example of a configuration of an information processing device.

FIG. 4 illustrates an example of a configuration of the information processing device 100 in the in-vehicle device 90. The information processing device 100 includes a preprocessor 120 and a support processor 140. The preprocessor 120 processes intersection information sent from the roadside machine 10. The support processor 140 performs driving support processing based on support information processed by the preprocessor 120. The preprocessor 120 includes an intersection information acquisition unit 122, a road information generator 124, a traveling position specification unit 126, and an support information generator 128.

When the wireless communication device 106 receives intersection information sent from the wireless communication device 22 of the roadside machine 10, the intersection information acquisition unit 122 acquires intersection information from the wireless communication device 106. The road information generator 124 generates road information on an intersection and the periphery of the intersection based on road linear information (map information) included in the intersection information.

Figure 5:
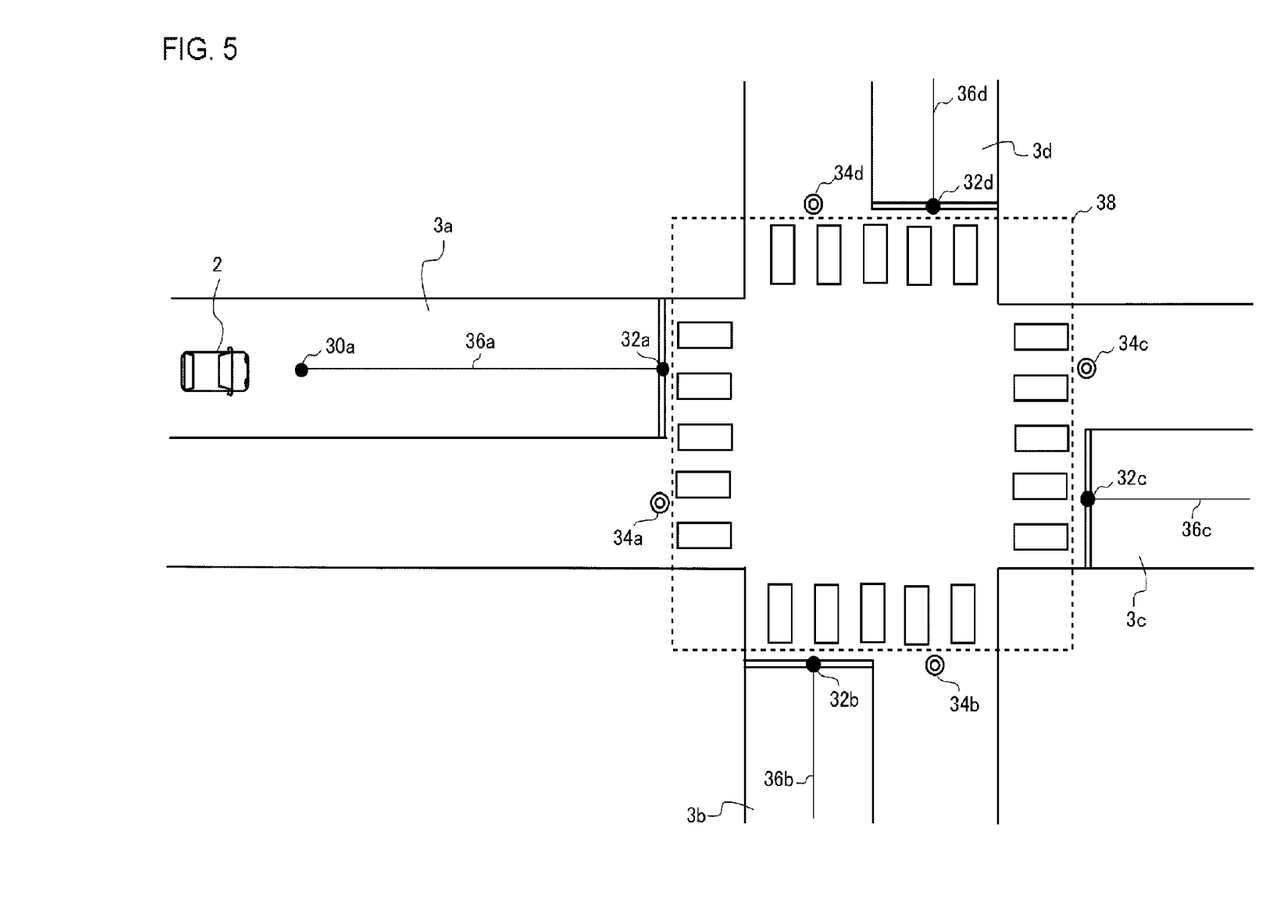
FIG. 5 is a view illustrating an example of road information.

FIG. 5 illustrates an example of the road information generated by the road information generator 124. The load linear information includes information on an intersection and a form of a road connecting to the intersection and includes node information used in driving support processing. The road form information and the node information are defined by a latitude and a longitude. Apart of these information determines service path information necessary when the traveling position specification unit 126 determines a traveling path. The service path information is information on the position from a starting point to a stop line on a path toward an intersection and information to determine the path on which an own vehicle is traveling before the driving support processing is performed.

A service path is specified by a starting point node and a stop line node. In the path 3a, a service path 36a is specified by a starting point node 30a and a stop line node 32a. Although starting point nodes on other paths 3b to 3d are not illustrated, as with the service path 36a, the service paths 36b to 36d are specified by each starting point node and the stop line nodes 32b to 32d.

Ending point nodes 34a to 34d indicate ending points on an intersection. For example, the three ending point nodes 34b to 34d are possible ending points of the intersection with respect to a vehicle moving on the service path 36a. Further, three ending point nodes 34a, 34c, and 34d are possible ending points of the intersection with respect to a vehicle moving on the service path 36b. In the embodiment, a region on an inner side of the ending point nodes 34a to 34d is called "an intersection region 38" for convenience.

The node information is used for specifying a position of the own vehicle 2 necessary for driving support processing. Specifically, the node information is used for determining whether the own vehicle 2 is positioned in front of the intersection region 38, whether the own vehicle 2 proceeds into the intersection region 38, or whether the own vehicle 2 passes by the intersection region 38. The road linear information includes distance information between a starting point node and a stop line node, distance information between the starting point node and the center of an intersection (or a stop line for right-turn), and distance information between the starting point node and an ending point node. These distance information is also used for specifying a position of the own vehicle 2 necessary for the driving support processing. Distance information between nodes means a road distance traveled by a vehicle and does not mean a straight distance even though the distance may be equal to a length connected with a straight line between the nodes.

In the example illustrated in FIG. 5, only a starting point node and a stop line node are indicated on a path. However, a node may be further included between the starting point node and the stop line node. Especially, if there is a branch route on a service path, a branch node may be set at a branch point position.

With reference to FIG. 4 again, the traveling position specification unit 126 determines a path on which the own vehicle 2 travels based on service path information generated by the road information generator 124 and own vehicle position detection information (a latitude, a longitude, and a direction) by the GPS receiver 108. The traveling position specification unit 126 specifies a traveling service path by selecting the closest path from service paths 36a to 36d indicated in FIG. 5 based on the latitude, the longitude, and the direction calculated by the GPS receiver 108. For example, the traveling position specification unit 126 calculates a distance between an own vehicle position detected by the GPS receiver 108 and each of the service paths 36a to 36d, and the shortest distance service path may be determined as a traveling service path. Herein, it is specified that the own vehicle 2 is traveling on the service path 36a.

The traveling position specification unit 126 specifies the service path 36a as a traveling service path and calculates a distance L1 between a position on the service path 36a corresponding to an own vehicle position and the starting point node 30a. Then, the distance L1 is used for calculating an own vehicle traveling distance L2 from the starting point node 30a.

The own vehicle traveling distance L2 from the starting point node is calculated as below.

(own vehicle traveling distance $L2$)=distance $L1+\Sigma$ (vehicle speed×time)

As described above, the traveling position specification unit 126 calculates the own vehicle traveling distance L2 from the distance L1 and a distance added up by using vehicle speed information by a wheel speed sensor. This calculation processing is performed at every 0.1 seconds, and the traveling position specification unit 126 provides calculated own vehicle traveling distance information to the support information generator 128. The own vehicle traveling distance L2 from a starting point node becomes necessary information for specifying a position of the own vehicle 2 by comparing distance information between nodes included in the road linear information.

When the traveling position specification unit 126 specifies the service path 36a on which the own vehicle 2 is traveling, the support information generator 128 generates support information to be provided to the support processor 140 based on intersection information sent from the roadside machine 10 and the own vehicle traveling distance L2 calculated by the traveling position specification unit 126. The support information generator 128 may have a function to calculate an own vehicle traveling distance and calculate a traveling distance from a starting point node.

The support information generator 128 specifies the object detection sensor 12 to detect an object targeted for right-turn support based on the service path 36a specified by the traveling position specification unit 126. Intersection information sent from the roadside machine 10 includes corresponding information with the service path and the object detection sensor 12. As illustrated in FIG. 2, the vehicle detection sensor 14a and the human detection sensor 16a are provided for supporting right turn of a vehicle traveling on the service path 36a. Therefore, the intersection information includes corresponding information indicating that the vehicle detection sensor 14a and the human detection sensor 16a are provided for the service path 36a. Similarly, the intersection information includes corresponding information indicating that the vehicle detection sensor 14b and the human detection sensor 16b are provided for the service path 36b, indicating that the vehicle detection sensor 14c and the human detection sensor 16c are provided for the service path 36c, and indicating that the vehicle detection sensor 14d and the human detection sensor 16d are provided for the service path 36d.

The intersection information sent from the roadside machine 10 includes detection information by all of the vehicle detection sensors 14a to 14d and the human detection sensors 16a to 16d. The support information generator 128 extracts detection information of the vehicle detection sensor 14a and the human detection sensor 16a corresponding to the service path 36a with reference to the corresponding information. Further, the support information generator 128 specifies the starting point node 30a and the stop line node 32a forming the service path 36a and specifies the ending point node 34b which becomes an ending point of right turn on an intersection. Accordingly, the support information generator 128 extracts, from the intersection information, distance information between the starting point node 30a and the stop line node 32a and distance information between the starting point node 30a and the ending point node 34b.

The intersection information is sent at every 0.1 seconds from the roadside machine 10 by broadcasting, and the support information generator 128 extracts detection information by the vehicle detection sensor 14a and the human detection sensor 16a at every 0.1 seconds. The support information generator 128 provides, to the support processor 140 at every 0.1 seconds as support information, own vehicle travel distance information, distance information between the starting point node 30a and the stop line node 32a, distance information between the starting point node 30a and the ending point node 34b, detection information by the vehicle detection sensor 14a, and detection information by the human detection sensor 16a. In the embodiment, it has been described with reference to the corresponding information that the support information generator 128 generates support information by appropriately extracting information necessary for the driving support processing. However, all of the detection information, the distance information and the corresponding information included in the intersection information may be included in the support information. In this case, processing to extract the necessary information is performed by the support processor 140.

The support processor 140 includes an support information acquisition unit 142, a support start determination unit 144, a support stop determination unit 146, and an alarm output unit 148. The support information acquisition unit 142 acquires support information generated by the support information generator 128. The support information generator 128 updates the support information at every 0.1 seconds, and the support information acquisition unit 142 acquires the support information at every 0.1 seconds. The support information acquisition unit 142 provides the acquired support information to the support start determination unit 144 and the support stop determination unit 146.

<Support Start Determination Processing>

Figure 6:
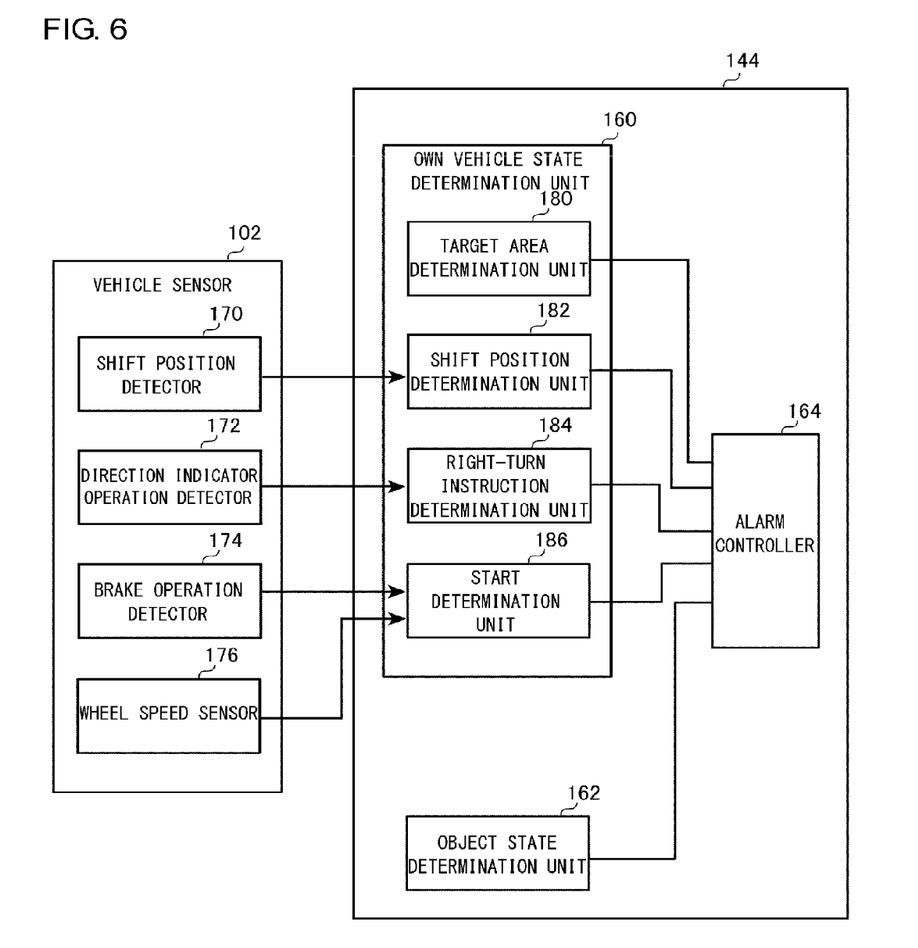
FIG. 6 is a diagram illustrating a configuration of a support start determination unit.

The support start determination unit 144 monitors establishment of conditions to support right-turn support.

The support start conditions will be described below.

(a1) An own vehicle traveling position is in a target area for right-turn support.

(a2) A driver intends to move forward.

(a3) A driver intends to turn right.

(a4) A vehicle starts from a stop state.

(a5) An oncoming vehicle or a person exists in the right turn direction at an intersection, or the oncoming vehicle and the person is approaching in the direction.

FIG. 6 illustrates a configuration of the support start determination unit 144. The support start determination unit 144 includes an own vehicle state determination unit 160, an object state determination unit 162, and an alarm controller 164. The own vehicle state determination unit 160 determines whether the own vehicle 2 intends to travel to cross the opposite lane at an intersection. In the embodiment, the own vehicle state determination unit 160 determines whether the own vehicle 2 intends to turn right at the intersection. The object state determination unit 162 determines based on the acquired object information (detection information) whether an oncoming vehicle or a person exists or moves in a direction in which the own vehicle 2 travels to cross the opposite lane at the intersection. When the own vehicle state determination unit 160 determines that the own vehicle 2 intends to cross the opposite lane at the intersection, and the object state determination unit 162 determines that an oncoming vehicle or a person exists or moves in the direction in which the own vehicle 2 travels to cross the opposite lane at the intersection, the alarm controller 164 generates an alarm output instruction and provides the instruction to an alarm output unit 148. The alarm output unit 148 outputs an alarm on receipt of the alarm output instruction.

Figure 7:
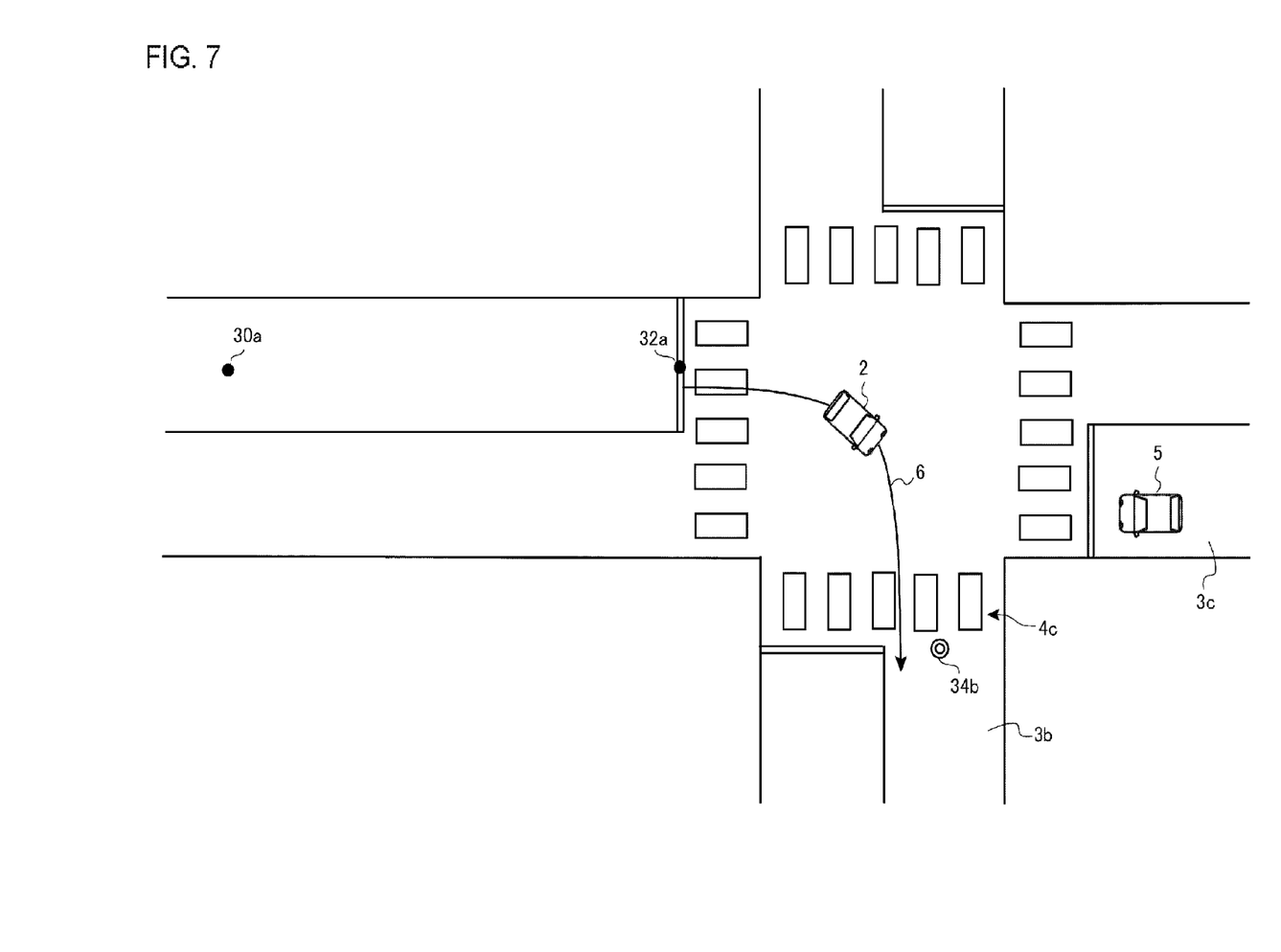
FIG. 7 is a view for describing support start determination processing.

FIG. 7 is a view for describing support start determination processing by the support start determination unit 144. In FIG. 7, the own vehicle 2 proceeds into an intersection region and stops once to turn right from the position. A traveling locus 6 is a locus of the own vehicle 2 proceeding into the intersection region, turning right at the intersection, and passing by the intersection region. The traveling locus 6 indicates a direction in which the own vehicle 2 passes by the intersection region, specifically a direction in which the own vehicle 2 travels to cross the opposite lane at the intersection. When the own vehicle 2 turns right in an intersection region, the own vehicle 2 crosses the path 3c which is the opposite lane and the pedestrian crossing 4c ahead of the opposite lane.

Determination processing of each condition will be described later. The own vehicle state determination unit 160 includes a target area determination unit 180, a shift position determination unit 182, a right-turn instruction determination unit 184, and a start determination unit 186 and determines whether the conditions (a1) to (a4) are established. The object state determination unit 162 determines whether the condition (a5) is established. The own vehicle state determination unit 160 and the object state determination unit 162 notify the alarm controller 164 of a determination result of each condition.

Whether the condition (a1) is established is determined by the target area determination unit 180 based on distance information included in support information. A target area for right-turn support is in an intersection region and determined by the following formula.

(a distance between a starting point node and a stop line node)≤(the distance $L2$ between a starting point node and an own vehicle)≤(a distance between a starting point node and an exit path ending point node)

With reference to FIG. 7, when the own vehicle 2 turns right at an intersection, the own vehicle 2 passes through the stop line node 32a and proceeds into the path 3b. Therefore, an ending point node on the exit path becomes the ending point node 34b. Therefore, the above determination formula is for determining that an own vehicle traveling position is positioned between the stop line node 32a and the ending point node 34b. When the determination formula is established, the target area determination unit 180 specifies that the own vehicle traveling position is in a target area for right-turn support and determines that the condition (a1) is established. The target area determination unit 180 notifies the alarm controller 164 of a determination result.

Whether the condition (a2) is established is determined by the shift position determination unit 182 based on detection result by a shift position detector 170 of the vehicle sensor 102. When the shift position detector 170 notifies the shift position determination unit 182 of detection information indicating that an operation position of a shift lever (shift position) is in a P (parking) position or an R (reverse) position, the shift position determination unit 182 specifies that the shift position is in the P position or the R position and determines from the current shift position that the own vehicle 2 cannot move forward currently. Specifically, when the shift lever is in the P position or the R position, the shift position determination unit 182 determines that a driver does not intend to move forward and determines that the condition (a2) is not established. On the other hand, when the shift position detector 170 notifies the shift position determination unit 182 of detection information indicating that the shift position is in a D (drive) position, the shift position determination unit 182 specifies that the shift position is in a position other than the P position and the R position and determines from the current shift position that the own vehicle 2 can move forward currently. Specifically, when the shift lever is in the D position, the shift position determination unit 182 determines that a driver intends to move forward and determines that the condition (a2) is established. The shift position determination unit 182 notifies the alarm controller 164 of a determination result.

When the shift position detector 170 notifies the shift position determination unit 182 of detection information indicating that the shift position is in a N (neutral) position, the shift position determination unit 182 may determine that a driver intends to move forward. Some driver sets a shift lever in the N position while stopping for right-turn. Therefore, even thought the shift position is in the N position, it is hard to determine that a driver does not intend to move forward. Therefore, according to the embodiment, when the shift position is in the N position, the shift position determination unit 182 determines that a driver intends to move forward and determines that the condition (a2) is established.

Whether the condition (a3) is established is determined based on detection information by the direction indicator operation detector 172 of the vehicle sensor 102 by the right-turn instruction determination unit 184. When a driver operates a direction indicator lever and blinks a right direction indicator, the direction indicator operation detector 172 provides, to the right-turn instruction determination unit 184, detection information indicating that the right direction indicator is turned on. The right-turn instruction determination unit 184 determines that the condition (a3) is established when receiving detection information that the right direction indicator is turned on. The right-turn instruction determination unit 184 notifies the alarm controller 164 of a determination result.

Establishment of the conditions (a1) to (a3) corresponds that the own vehicle 2 intends to proceed into an intersection and cross the opposite lane. The own vehicle state determination unit 160 determines by the establishment of the conditions (a1) to (a3) that the own vehicle 2 intends to proceed into an intersection and cross the opposite lane at the intersection.

Whether the condition (a4) is established is determined by the start determination unit 186 by whether a stop state is released from the past stop state. Therefore, the condition (a4) is divided into (a4-1) and (a4-2). The condition (a4-1) is that a vehicle was in a stop state. The condition (a4-2) is that the stop state was released.

The brake operation detector 174 notifies the start determination unit 186 of detection information on brake pedal operation. The wheel speed sensor 176 notifies the start determination unit 186 of vehicle speed information of the own vehicle 2.

(a4-1) A Vehicle was in a Stop State.

When turning right at an intersection, the own vehicle 2 proceeds into the intersection while decelerating. At this time, when a driver visually confirms that an oncoming vehicle and a pedestrian do not exist at the intersection, the driver sometimes turns right at an intersection without temporarily stopping the own vehicle 2. When an alarm is output while turning right in such situation, the alarm may confuse a driver and disturb safe driving. Further, when a driver operates a right direction indicator and changes from the left lane to the right lane while moving in an intersection on a road with two lanes on each side, the vehicle does not intend to turn right at the intersection, and therefore an alarm should not be output. In view of such a state, driving support is suitably performed when a driver confirms safety by stopping temporarily in an intersection. Therefore, a state in which a vehicle was in a stop state is included as one of the driving support start conditions.

Herein, the condition (a4-1) may be defined as a state in which a brake pedal was operated, and for example, a traveling state at 3.0 km/h or less or a stop state has been continued for 1 second. A traveling state at 3.0 km/h or less while an brake pedal is operated is recognized that a driver intends to stop and also can stop immediately. Therefore, it is recognized that a vehicle was in a substantial stop state. Then, the start determination unit 186 determines based on detection information by the brake operation detector 174 and the wheel speed sensor 176 whether a brake pedal has been operated, and a traveling state at 3.0 km/h or less or a stop state has been continued for 1 second. If this condition (a4-1) is established, the start determination unit 186 monitors whether the condition (a4-2) is established.

(a4-2) A Stop State was Released.

While the condition (a4-1) is continuously established, the start determination unit 186 monitors detection information by the brake operation detector 174 and determines that the condition (a4-2) is established when detecting that a brake was turned off. Accordingly, the start determination unit 186 determines that the condition (a4) is established. The start determination unit 186 notifies the alarm controller 164 of a determination result.

Whether the condition (a5) is established is determined as below.

<An Oncoming Vehicle is Existing or Approaching>

Support information provided from the preprocessor 120 includes a speed of an oncoming vehicle with respect to the own vehicle 2 and a distance to a detection area end (the center of an intersection) of the vehicle. From these information, the object state determination unit 162 calculates a time T1 until the oncoming vehicle arrives at the center of an intersection.

An arrival time $T1$=(a distance until an oncoming vehicle arrives at the center of an intersection)/(a vehicle speed of the oncoming vehicle)

The object state determination unit 162 determines that an oncoming vehicle exists or approaches when the arrival time T1 is equal to or less than a predetermined threshold. If the support information includes information on a plurality of on-coming vehicles, the object state determination unit 162 calculates the arrival time T1 for each oncoming vehicle and compares with a predetermined threshold. The object state determination unit 162 determines that an oncoming vehicle is existing or approaching if at least one arrival time is equal to or less than the predetermined threshold.

<A Person is Existing or Approaching>

Support information provided from the preprocessor 120 includes information indicating whether a person exists on or around a pedestrian crossing on which a vehicle passes by when turning right. Then, the object state determination unit 162 determines that a person exists if the support information includes information indicating that there is a person. Further, if the support information includes a position, a moving direction, and a speed of a person, the object state determination unit 162 may determine based on the information whether the person is approaching to or going away from a region crossing the traveling locus 6 and the pedestrian crossing 4c (refer to FIG. 7). When the object state determination unit 162 determines that the person is moving forward to a region in which the own vehicle 2 passes by the pedestrian crossing 4c, the object state determination unit 162 determines that the person is approaching.

Establishment of the condition (a5) corresponds that an oncoming vehicle or a person exists or moves in a direction in which the own vehicle 2 travels to cross the opposite lane at the intersection. In the embodiment, "a direction in which a vehicle travels to cross the opposite lane" is a direction in which the own vehicle 2 turns right at an intersection, and the direction is indicated by the traveling locus 6 illustrated in FIG. 7. The object state determination unit 162 determines that the condition (a5) is established when the object state determination unit 162 determines that an oncoming vehicle or a person exists or when the oncoming vehicle or the person is approaching.

The own vehicle state determination unit 160 determines whether the conditions (a1) to (a4) are established and notifies the alarm controller 164 of a determination result of each condition. Further, the object state determination unit 162 determines whether the condition (a5) is established and notifies the alarm controller 164 of a determination result. The alarm controller 164 determines that the support start conditions are not established even if at least one of the conditions (a1) to (a5) is not established, and waits for right-turn support.

On the other hand, the alarm controller 164 determines that the support start conditions are established when all of the conditions (a1) to (a5) are established. When the alarm controller 164 determines that the support start conditions are established, the alarm controller 164 generates an alarm output instruction and notifies the alarm output unit 148 of the instruction. The alarm output unit 148 outputs an alarm from the output device 104 on receipt of the alarm output instruction. The alarm output unit 148 outputs an alarm screen including letters of "watch out for right turn" from a display device of the output device 104 and also may output an alarm sound from a sound output device of the output device 104.

Figure 8:
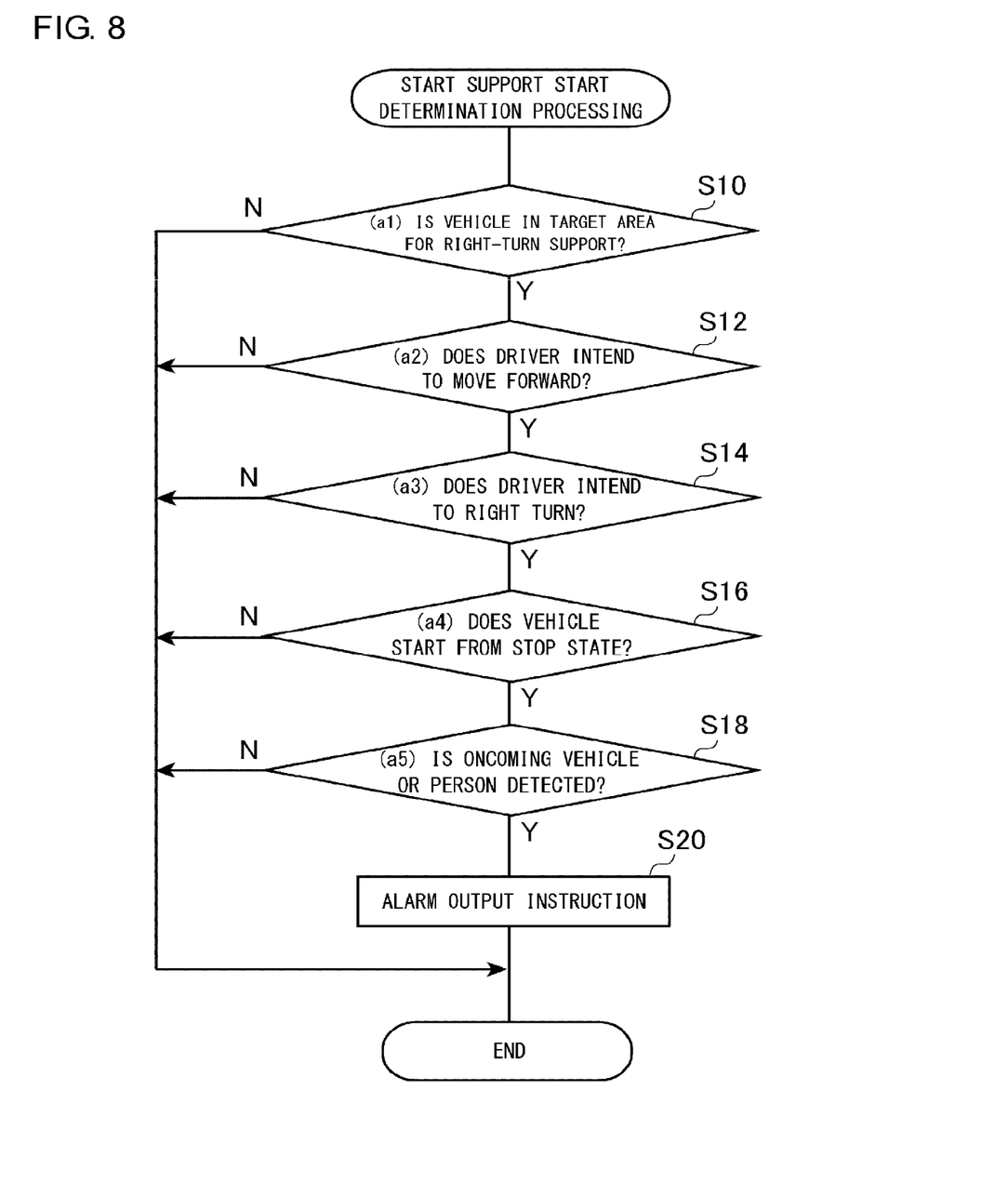
FIG. 8 is a flowchart illustrating the support start determination processing.

FIG. 8 is a flowchart illustrating support start determination processing by the support start determination unit 144. The target area determination unit 180 determines whether the own vehicle traveling position is in a target area for right-turn support (S10). Herein, the target area for the right-turn support is an intersection region 38 (refer to FIG. 5), and when the target area determination unit 180 determines that the own vehicle traveling position is not in the intersection region 38 (N in S10), the target area determination unit 180 notifies the alarm controller 164 that the condition (a1) is not established. The alarm controller 164 determines that the support start conditions are not established when the alarm controller 164 is notified that the condition (a1) is not established. On the other hand, when the target area determination unit 180 determines that the own vehicle traveling position is in the intersection region 38 (Y in S10), the target area determination unit 180 notifies the alarm controller 164 that the condition (a1) is established.

The shift position determination unit 182 determines whether a driver intends to move forward (S12). Herein, the shift position determination unit 182 determines that a driver does not intend to move forward when a shift position is in either of a P position or an R position (N in S12) and notifies the alarm controller 164 that the condition (a2) is not established. The alarm controller 164 determines that the support start conditions are not established when the alarm controller 164 is notified that the condition (a2) is not established. Thus, when a driver does not intend to move forward, it is prevented that an alarm is unnecessarily output. On the other hand, the shift position determination unit 182 determines that a driver intends to move forward when a shift position is not in the P position and the R position (Y in S12) and notifies the alarm controller 164 that the condition (a2) is established.

The right-turn instruction determination unit 184 determines whether a driver intends to turn right (S14). Herein, the right-turn instruction determination unit 184 determines that a driver does not intend to right turn when detection information by the direction indicator operation detector 172 indicates that a right direction indicator is in the off position (N in S14) and notifies the alarm controller 164 that the condition (a3) is not established. The alarm controller 164 determines that the support start conditions are not established when the alarm controller 164 is notified that the condition (a3) is not established. Thus, when a driver does not intend to turn right, it is prevented that an alarm is unnecessarily output. On the other hand, the right-turn instruction determination unit 184 determines that a driver intends to turn right when detection information by the direction indicator operation detector 172 indicates that a right direction indicator is in the on position (Y in S14), and the right-turn instruction determination unit 184 notifies the alarm controller 164 that the condition (a3) is established.

The start determination unit 186 determines whether a vehicle has started from a stop state (S16). When the start determination unit 186 determines from detection information by the brake operation detector 174 and the wheel speed sensor 176 that a vehicle has been stopped or recognized to stop since a brake was operated, and then the brake was released from the state (Y in S16), the start determination unit 186 notifies the alarm controller 164 that the condition (a4) is established. On the other hand, if a brake has not been operated, or if the vehicle has not been recognized to stop even though a brake has been operated, or if a brake operation was not released, the start determination unit 186 determines that the condition (a4) is not established (N in S16) and notifies the alarm controller 164 that the condition (a4) is not established. The alarm controller 164 determines that the support start conditions are not established when the alarm controller 164 is notified that the condition (a4) is not established.

The object state determination unit 162 determines whether the object detection sensor 12 detects an oncoming vehicle or a person to watch out for a driver (S18). When the object state determination unit 162 determines that the oncoming vehicle or the person to watch out for a driver is detected (Y in S18), the object state determination unit 162 notifies the alarm controller 164 that the condition (a5) is established. On the other hand, when the object state determination unit 162 determines that the oncoming vehicle or the person to watch out for a driver is not detected (N in S18), the object state determination unit 162 notifies the alarm controller 164 that the condition (a5) is not established. The alarm controller 164 determines that the support start conditions are not established when the alarm controller 164 is notified that the condition (a5) is not established.

When the alarm controller 164 is notified that all of the conditions (a1) to (a5) are established, the alarm controller 164 determines that the support start conditions are established and notifies the alarm output unit 148 of an alarm output instruction. On receipt of the instruction, the alarm output unit 148 outputs an alarm.

Determination processing of each condition is not according to the order of the flowchart illustrated in FIG. 8, and each processing may be performed independently. The alarm controller 164 may monitor whether each condition is established, generate an alarm output instruction at a timing when all of the conditions are establish, and notify the alarm output unit 148 of the instruction.

<Support Stop Determination Processing>

Figure 9:
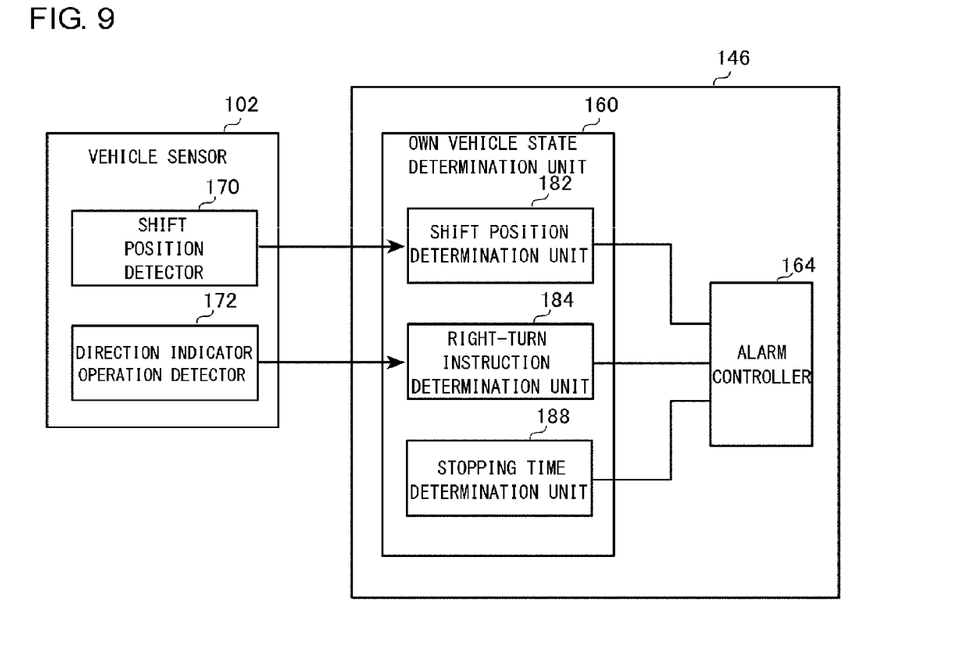
FIG. 9 is a diagram illustrating a configuration of a support stop determination unit.

When an alarm is output, the support stop determination unit 146 monitors establishment of conditions to stop right-turn support.

The support stop conditions will be described below.

(b1) A driver does not intend to move forward.

(b2) A driver does not intend to turn right.

(b3) A predetermined time has passed since support is started.

FIG. 9 illustrates a configuration of the support stop determination unit 146. The support stop determination unit 146 includes the own vehicle state determination unit 160 and the alarm controller 164. The own vehicle state determination unit 160 monitors an own vehicle state and determines from a change in the own vehicle state after an alarm is output whether the alarm output may be continued. The own vehicle state determination unit 160 includes the shift position determination unit 182, the right-turn instruction determination unit 184, and a stopping time determination unit 188. The shift position determination unit 182, the right-turn instruction determination unit 184, and the alarm controller 164 are denoted by the same symbols with components included in the support start determination unit 144 illustrated in FIG. 6 and include the same or similar functions to the components illustrated in FIG. 6. As described above, in the support start determination unit 144 and the support stop determination unit 146, at least a part of the components may be commonly used.

In the support start determination processing by the support start determination unit 144 illustrated in FIG. 6, it has been described that the shift position determination unit 182 determines that the condition (a2) is established when a driver intends to move forward, and also the right-turn instruction determination unit 184 determines that the condition (a3) is established when the driver intends to turn right. When the support start conditions and the support stop conditions are compared, the condition (a2) and the condition (b1) are in an opposed relation, and the condition (a3) and the condition (b2) are in an opposed relation. Specifically, establishment of the condition (a2) corresponds to that the condition (b1) is not established, and also establishment of the condition (a3) corresponds to that the condition (b2) is not established.

In the support stop determination processing to be indicated below, the shift position determination unit 182 determines that the condition (b1) is established when a driver does not intend to move forward, and also the right-turn instruction determination unit 184 determines that the condition (b2) is established when the driver does not intend to turn right.

Whether the condition (b1) is established is determined based on a detection information by the shift position detector 170 of the vehicle sensor 102 by the shift position determination unit 182. When the shift position detector 170 notifies the shift position determination unit 182 of detection information indicating that a shift position is in the P position or the R position, the shift position determination unit 182 determines that the shift position is in the P position or the R position and determines from the current shift position that the own vehicle 2 cannot move forward currently. Specifically, when the shift lever is in the P position or the R position, the shift position determination unit 182 determines that a driver does not intend to move forward and determines that the condition (b1) is established.

For example, it is assumed that an alarm is output when a driver releases brake operation to turn right from the substantial center of an intersection. At this time, if a part of the own vehicle 2 is in the opposite lane, the driver sometimes sets a shift lever to the R position to move the own vehicle 2 backward a little. In such a case, it is not necessary to continue the alarm output since the driver already recognizes an oncoming vehicle by an alarm and avoids a collision. After an alarm is output, it is not necessary to continue the alarm output to a driver who does not intend to move forward. Therefore, the shift position determination unit 182 determines that the driver does not intend to move forward when the driver switches a shift position to the P position or the R position and determines that the condition (b1) is established. The shift position determination unit 182 notifies the alarm controller 164 of a determination result.

Whether the condition (b2) is established is determined by the right-turn instruction determination unit 184 based on detection information by the direction indicator operation detector 172 of the vehicle sensor 102. When a driver operates a direction indicator lever to turn off blinking of a right direction indicator, the direction indicator operation detector 172 provides detection information indicating that the right direction indicator is turned off to the right-turn instruction determination unit 184. The right-turn instruction determination unit 184 determines that the condition (b2) is established when receiving detection information that the right direction indicator is turned off.

For example, when a driver determines to stop turning right and move straight on the main lane, the driver operates a direction indicator lever and stops blinking a right direction indicator. After an alarm is output, it is not necessary to continue the alarm output to a driver who does not intend to turn right. Therefore, the right-turn instruction determination unit 184 determines that a driver does not intend to turn right when the driver stops blinking the right direction indicator after the alarm is output and determines that the condition (b2) is established. The right-turn instruction determination unit 184 notifies the alarm controller 164 of a determination result.

Whether the condition (b3) is established is determined by the stopping time determination unit 188 based on a timer measurement result after an alarm is output. The stopping time determination unit 188 monitors whether a predetermined time, for example 2 seconds, has passed after the alarm controller 164 notifies the alarm output unit 148 of an alarm output instruction and determines the condition (b3) is established when 2 seconds has passed since alarm output. The stopping time determination unit 188 notifies the alarm controller 164 of a determination result.

The alarm controller 164 determines that support stop conditions are established if any one of the condition (b1) to (b3) is established. When the support stop determination unit 146 determines that the support stop conditions are established, the support stop determination unit 146 generates an alarm output stop instruction and notifies the alarm output unit 148 of the instruction. The alarm output unit 148 stops alarm output from the output device 104 on receipt of the alarm output stop instruction.

Figure 10:
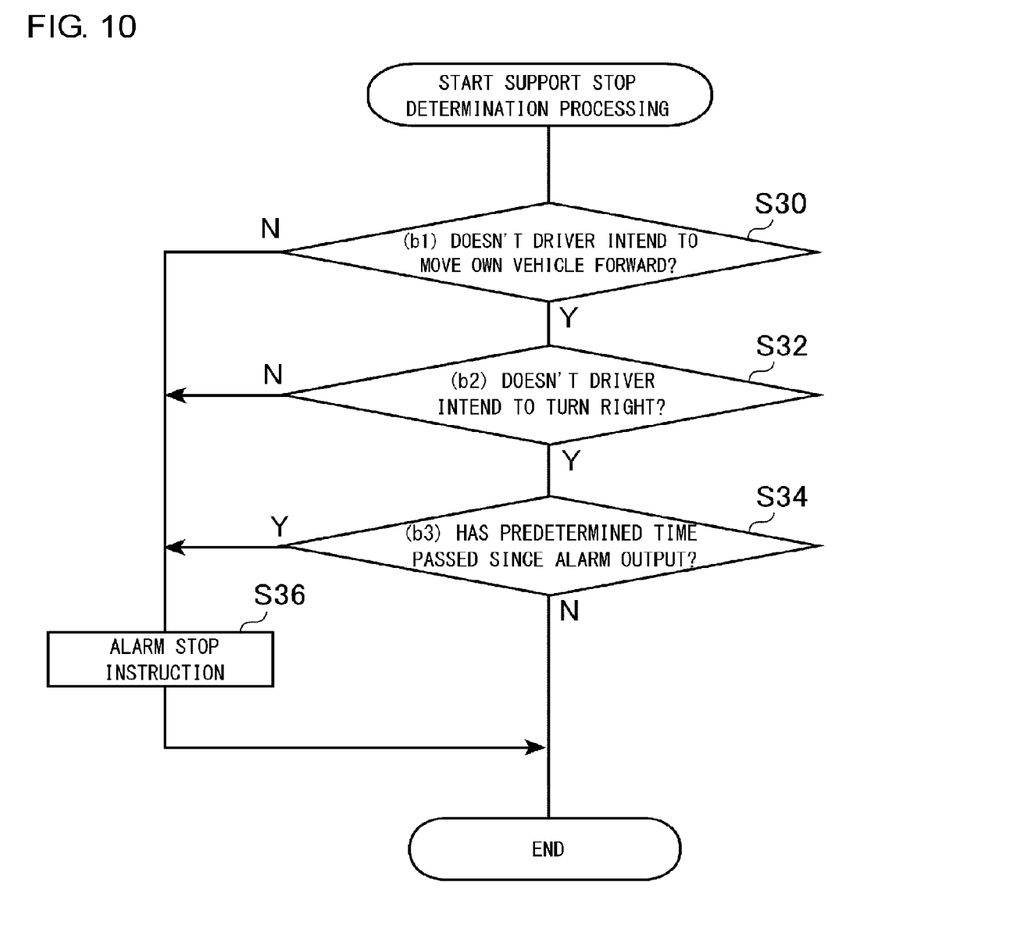
FIG. 10 is a flowchart illustrating support stop determination processing.

FIG. 10 is a flowchart illustrating support stop determination processing by the support stop determination unit 146. The shift position determination unit 182 determines whether a driver does not intend to move forward (S30). Herein, the shift position determination unit 182 determines that a driver does not intend to move forward when a shift position is in either of the P position or the R position (N in S30) and notifies the alarm controller 164 that the condition (b1) is established. When the alarm controller 164 is notified that the condition (b1) is established, the alarm controller 164 determines that the support stop conditions are established and generates an instruction to stop alarm output (S36). On the other hand, the shift position determination unit 182 determines that a driver intends to move forward when a shift position is not in the P position and the R position (Y in S30) and notifies the alarm controller 164 that the condition (b1) is not established.

The right-turn instruction determination unit 184 determines whether a driver does not intend to turn right (S32). Herein, the right-turn instruction determination unit 184 determines that a driver does not intend to right turn when detection information of the direction indicator operation detector 172 indicates that aright direction indicator is in the off position (N in S32) and notifies the alarm controller 164 that the condition (b2) is established. When the alarm controller 164 is notified that the condition (b2) is established, the alarm controller 164 determines that the support stop conditions are established and generates an instruction to stop alarm output (S36). On the other hand, the right-turn instruction determination unit 184 determines that a driver intends to turn right when detection information by the direction indicator operation detector 172 indicates that a right direction indicator is in the on position (Y in S32) and notifies the alarm controller 164 that the condition (b2) is not established.

The stopping time determination unit 188 determines whether a predetermined time has passed since an alarm is output (S34). When the stopping time determination unit 188 determines that the predetermined time has passed since the alarm is output (Y in S34), the stopping time determination unit 188 notifies the alarm controller 164 that the condition (b3) is established. When the alarm controller 164 is notified that the condition (b3) is established, the alarm controller 164 determines that the support stop conditions are established and generates an instruction to stop alarm output (S36). On the other hand, when the stopping time determination unit 188 determines that the predetermined time has not passed since the alarm is output (N in S34), the stopping time determination unit 188 notifies the alarm controller 164 that the condition (b3) is not established.

When the alarm controller 164 is notified that any one of the conditions (b1) to (b3) is established, the alarm controller 164 determines that the support start conditions are established and notifies the alarm output unit 148 of an instruction to stop alarm output. On receipt of the instruction, the alarm output unit 148 stops alarm output.

Determination processing of each condition is not according to the order of the flowchart illustrated in FIG. 10, each processing may be performed independently. The alarm controller 164 may monitor whether each condition is established, generate an instruction to stop alarm output at a timing when any one of the conditions is established, and notify the alarm output unit 148 of the instruction.

The present invention has been described above according to the embodiment. The embodiment is described as an example. A person skilled in the art understands that the embodiment can be varied by combination of each component and each processing, and such variation is within the scope of the present invention.

In the embodiment, it has been described that the vehicle detection sensor 14 detects oncoming vehicle information of the own vehicle 2, and the intersection information acquisition unit 122 acquires the detected oncoming vehicle information. However, information indicating a position and a speed of the oncoming vehicle may be sent by vehicle-to-vehicle communication to the own vehicle 2 from the oncoming vehicle 5 traveling on the opposite lane and acquired by the intersection information acquisition unit 122.

According to the embodiment, when the shift position detector 170 notifies the shift position determination unit 182 of detection information indicating that a shift position is in the N position, the shift position determination unit 182 determines that a driver intends to move forward. However, the N position is not a shift position for moving the own vehicle 2 forward, and therefore, in the variation, the shift position determination unit 182 may determine that a driver does not intend to move forward and determine that the condition (a2) is not established.

What is claimed is:

1. A driving support device, comprising:
    a shift position detector configured to detect a position of a shift lever of an own vehicle being driven by a user;
    an acquirer configured to acquire object information about an approaching of at least one of an oncoming vehicle and a person at an intersection of a road;
    an own vehicle state determiner configured to determine whether the own vehicle, driven by the user, intends to cross an opposite lane at the intersection of the road;
    an object state determiner configured to determine based on the acquired object information whether the at least one of an oncoming vehicle and the person exists or moves in a direction in which the own vehicle travels to cross the opposite lane at the intersection;
    an alarm controller configured to, when the shift position detector detects that the shift lever is in a driving position, generate an alarm output instruction when (i) the own vehicle state determiner determines that the own vehicle intends to cross the opposite lane at the intersection, and (ii) the object state determiner determines that the at least one of an oncoming vehicle and the person exists or moves in the direction in which the own vehicle travels to cross the opposite lane at the intersection;
    an alarm outputter configured to output an alarm on receipt of the alarm output instruction; and
    wherein when the shift position detector detects that the shift lever is in a parking position or a reverse position, the alarm controller does not generate the alarm output instruction.

2. The driving support device according to claim 1, wherein when the shift position detector detects that the shift lever is in the parking position or the reverse position, the own vehicle state determiner determines that the own vehicle cannot move forward currently.

3. The driving support device according to claim 1, wherein, after the alarm outputter outputs an alarm, when the shift position detector detects that the shift lever is in the parking position or the reverse position, the alarm controller generates an instruction to stop alarm output.

* * * * *